Figure 1:
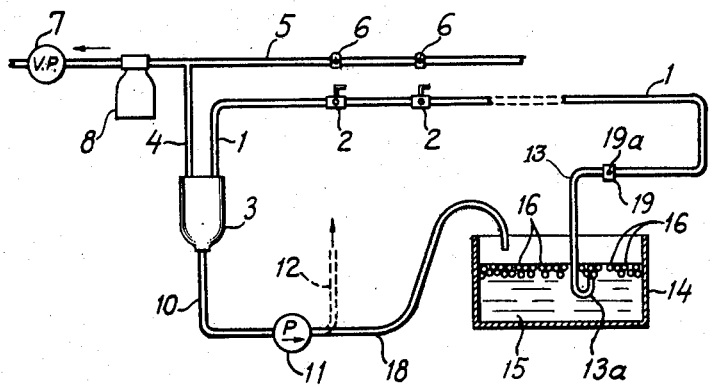

Jan. 8, 1963 E. BAUM 3,072,503
METHOD OF CLEANING PIPE-LINE MILKING INSTALLATIONS
Filed Dec. 2, 1959

INVENTOR.
Engelbert Baum
BY Davis, Hoxie, Faithfull Hapgood 3,072,503
METHOD OF CLEANING PIPE-LINE MILKING INSTALLATIONS
Engelbert Baum, Vienna, Austria, assignor to Aktiebolaget Separator, Stockholm, Sweden, a corporation of Sweden
Filed Dec. 2, 1959, Ser. No. 856,792
Claims priority, application Austria Dec. 12, 1958
1 Claim. (Cl. 134—8)

This invention relates to pipe-line milking installations wherein the milk drawn from the cows' udders into individual teat-cup assemblies is passed through a common milk pipe-line, usually by vacuum, to a collecting tank or to apparatus for processing the milk. More particularly, the invention has reference to an improved method for cleaning the milk pipe-line of such an installation.

Heretofore, the pipes of pipe-line milking installations have been cleaned by flushing them with a cleaning liquid or a disinfecting liquid and thereafter with pure water. The liquid may be pumped or sucked in a continuous current through the pipes, although this requires large quantities of liquid. Accordingly, in some instances the liquid is pumped or sucked in a limited quantity and intermittently through the pipes so that the liquid passes through the pipes in the form of slugs separated more or less by air slugs or pockets, this method enabling more economical use of the liquid.

It is also known to drive a plug of rubber, plastic, or the like through the milk pipe-line after the milking or the cleaning of the milking installation is completed. This causes removal of residues of milk or cleaning liquid left in the pipe-line. However, these plugs are introduced into the pipe-line by hand, the purpose of the plugs being to empty and simultaneously clean the pipes. This procedure has the disadvantage that it is inefficient, as it is usually carried out only once due to the fact that it is time-consuming and requires considerable manual labor.

The principal object of the present invention is to provide a method for cleaning pipe-line milking installations, which overcomes the above-noted disadvantage.

According to the invention, a body of the cleaning liquid (which may be a soap solution, a disinfectant solution, or a rinsing liquid) is maintained in a reservoir, and suspended in this liquid body are plug-like members adapted for passage through the milk pipe-line. These plug-like members are preferably designed to float in the body of cleaning liquid and may be made of an elastically deformable material such as moltoprene, foam rubber, sponges, or the like. They may be shaped as spheres or they may be somewhat elongated, and they may be provided with roughened surfaces to serve as brushes. From this reservoir, a quantity of the cleaning liquid is passed through the milk pipe-line interspersed with the plug-like members and with air, and the liquid with the plug-like members is returned from the pipe-line to the reservoir. The liquid quantity, plug-like members and air may be drawn through the pipe-line by suction, or they may be forced through the pipe-line under positive pressure by a pump.

For a better understanding of the invention, reference may be had to the accompanying drawing in which two illustrations are schematic views of preferred forms of installations for carrying out the new method.

Referring to FIG. 1 of the drawing, the reference numeral 1 designates the milk pipe-line of a milking installation. At spaced points along the milk pipe-line 1, the latter is provided with the usual valve fittings 2 through which the milk hoses of the usual teat-cup assemblies (not shown) are connected to the pipe-line. The milk pipe-line 1 leads into a milk receiver 3, the upper portion of which is connected through a pipe 4 to a vacuum line 5. The latter is provided with the usual valve fittings 6 for connection to the vaccum hoses (not shown) of the teat-cup assemblies. Thus, each milking station is provided with a valve fitting 2 and a valve fitting 6 for connecting the milk hose and the vacuum hose of a teat-cup assembly to the milk pipe-line 1 and the vacuum pipe-line 5, respectively, as will be readily understood by those skilled in the art.

Vacuum pipe-line 5 leads to a vacuum pump 7 for maintaining a predetermined sub-atmospheric pressure in the line 5. A moisture trap 8 may be inserted in the vacuum line 5 between the valve fittings 6 and the vacuum pump 7.

A pipe 12 leads from the bottom of the milk receiver 3 to a milk pump 11. The pump 11, which may be of the type commonly used as a milk pump in milking installations, serves to pump the milk from the receiver 3 through a conduit 12 to a holding or storage tank (not shown) or to any other place for further processing.

A conduit 13 is adapted for connection to the end of milk pipe-line 1 which is remote from the milk receiver 3. The conduit 13 extends into a tank 14 serving as a reservoir for a body of the cleaning liquid 15. The end of the conduit 13 remote from the pipe-line 1 is immersed in the liquid body 15 near the upper surface thereof, this liquid body containing a plurality of plug-like members 16. The members 16 float in the liquid 15 so that they are suspended in this liquid at or near its free upper surface, that is, in the region of the entrance end of the conduit 13, and they are of a size such that they are adapted for passage through this conduit.

When the milking operation is completed and the milk pipe-line 1 is to be cleaned, a conduit 18 (which may be a flexible hose) is connected to the outlet side of the milk pump 11 in place of the conduit 12, and is led into the tank 14 for the cleaning liquid. Likewise, the conduit 13 (which may also be a flexible hose) is connected to the milk pipe-line 1 as by means of a fitting 19. Accordingly, with the vacuum pump 7 and the milk pump 11 in operation, the cleaning liquid will be drawn from tank 14 through conduit 13 and milk pipe-line 1 into receiver 3, and will be returned from the latter to the tank 14 by way of pipe 10, pump 11, and conduit 18. At the same time, plug members 16 will be drawn into the conduit 13 intermittently and returned to the tank 14 with the cleaning liquid through the return conduit 18. Also, air is admitted to the milk pipe-line 1, as through a small opening 19a in the fitting 19, so that the cleaning liquid flows through this pipe-line in the form of slugs more or less separated by slugs of air. Thus, a quantity of the cleaning liquid 15 is circulated through the milk pipe-line 1 interspersed with plug-like members 16 and with air, the liquid and plug-like members being returned to the tank 14 from the receiver 3 through pipe 10, pump 11, and conduit 18.

It will be understood that during the cleaning operation, the milk and vacuum hoses of the teat-cup assembly are disconnected from the valve fittings 2 and 6, and the latter are closed to prevent entrance of air into the corresponding pipe-lines.

It will also be understood that air may be admitted to the milk pipe-line 1, during the cleaning operation, by means other than the air inlet opening 19a in the fitting 19, as by intermittently raising the entrance end 13a of the conduit 13 above the liquid level in tank 14. Also, the entrance end 13a of conduit 13 may be provided with a float (not shown) to ensure that this end will be immersed in the liquid body 15 near the upper surface thereof regardless of changes in the liquid level.

Figure 2:
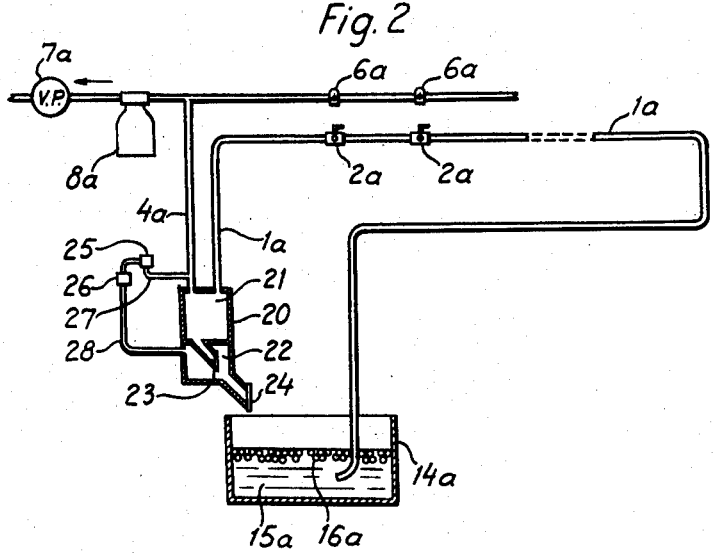

Referring to FIG. 2 of the drawing, this shows another embodiment of the invention in which most of the details are the same as in FIG. 1. Details in FIG. 2 which are the same as in FIG. 1 are to that end marked with the same reference numeral with addition of the letter "a."

The milk receiver 3 in FIG. 1 is in FIG. 2 replaced by a milk receiver 20, of the type called releaser. The releaser 20 consists of a closed tank divided into two separate chambers 21 and 22. The vacuum pipe-line 4a and the milk pipe-line 1a open both into the top of the chamber 21. The chamber 21 communicates with the chamber 22 over a flapper-valve 23 and the chamber 22 communicates with the open atmosphere and with the tank 14a over another flapper-valve 24. The reference numerals 25 and 26 designate a pulsator which is connected to the vacuum pipe-line 4a by a pipe-line 27 and to the chamber 22 by a pipe-line 28. By aid of the pulsator vacuum and atmospheric pressure alternately are received in the chamber 22. In FIG. 2 the pipe-line 1a ends below the level of the liquid in the tank 14a which tank is smaller than the tank 14 in FIG. 1. The object of the latter is to make it possible to have the liquid level in the tank 14a to sink to a point below the open end of the pipe-line 1a in the tank 14a during the cleaning operation so that air alternately with liquid and plug-like members can be sucked into said pipe-line hastening the transport of the liquid and the plug-like members through the milk pipe-line.

The arrangement according to FIG. 2 functions during cleaning as follows:

In a certain moment after having started the pulsator 25, 26 vacuum is at hand in the chamber 21 and atmospheric pressure in the chamber 22. The flapper-valve 23 is then closed and the flapper-valve 24 open resulting in emptying of the chamber 22 into the tank 14a. Liquid 15a and plug-like members 16a are then sucked by vacuum from the tank 14a through pipe-line 1a into the chamber 21 until the liquid level in the tank 14a has sunk to a point permitting air entering the pipe-line 1a. In that moment, owing to the vacuum suction from the chamber 21 the liquid and the plug-like members in the pipe-line 1a with a very great velocity are sucked through the pipe-line 1a and assembled into the chamber 21. In the next moment the pulsator 25, 26 changes the connection between the chamber 22 and the atmosphere to connection with the vacuum pipe-line 4a resulting in opening of the flapper-valve 23 and closing of the flapper-valve 24. The liquid and the plug-like members in chamber 21 are then emptied into the chamber 22. When in the next moment the pulsator 25, 26 changes the connection of the chamber 22 from vacuum to atmospheric pressure the flapper-valve 23 will be closed and the flapper-valve 24 opened resulting in an emptying of the liquid and the plug-like members from the chamber 22 into the tank 14a. As soon as the liquid level in the tank 14a thereby has risen to a point above the open end of the pipe-line 1a in the tank 14a the course will be repeated.

I claim:

A method of cleaning the milk pipe-line of a milking installation, which comprises maintaining in a reservoir a body of cleaning liquid while floating in said liquid body a plurality of plug-like members each adapted to substantially completely fill the cross-section of the interior of the pipe-line and adapted for passage through the pipe-line, passing from the upper portion of said body and through the pipe-line a quantity of said liquid interspersed with said plug-like members and with air, and returning the liquid with said plug-like members from the pipe-line to said reservoir.

References Cited in the file of this patent

UNITED STATES PATENTS

| | | |
|---|---|---|
| 1,907,411 | Timoney | May 2, 1933 |
| 2,015,567 | Lowry | Sept. 24, 1935 |
| 2,076,414 | Panagopoulos | Apr. 6, 1937 |
| 2,222,516 | Powell | Nov. 19, 1940 |
| 2,680,445 | Hemminger | June 8, 1954 |